A. J. SCHREINER.
RESERVE SUPPLY CONTROLLING DEVICE FOR LIQUID RECEPTACLES.
APPLICATION FILED APR. 16, 1920.

1,416,885.  Patented May 23, 1922.

Inventor:
ANDREW J. SCHREINER
by
Frank L. Sessions
Attorney.

United States Patent Office.

ANDREW J. SCHREINER, OF CLEVELAND, OHIO.

RESERVE-SUPPLY-CONTROLLING DEVICE FOR LIQUID RECEPTACLES.

1,416,885.

Specification of Letters Patent.   Patented May 23, 1922.

Application filed April 16, 1920.   Serial No. 374,461.

*To all whom it may concern:*

Be it known that I, ANDREW J. SCHREINER, a citizen of the United States, residing at Cleveland, in the county of Cuyahoga and State of Ohio, have invented certain new and useful Improvements in Reserve-Supply-Controlling Devices for Liquid Receptacles, of which the following is a specification.

My invention is particularly useful in connection with gasoline tanks used upon motor vehicles but, as is obvious, it may be applied to any liquid receptacle where it is desired that a warning be given of the approaching exhaustion of the supply of liquid in the receptacle before the supply is in fact completely exhausted.

Figure 1:
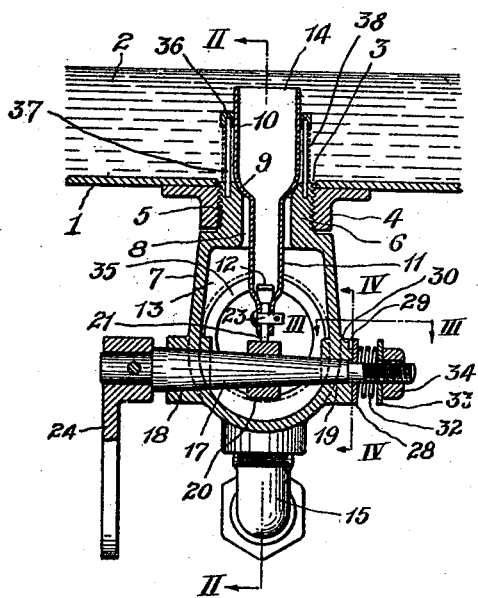
Figure 2:
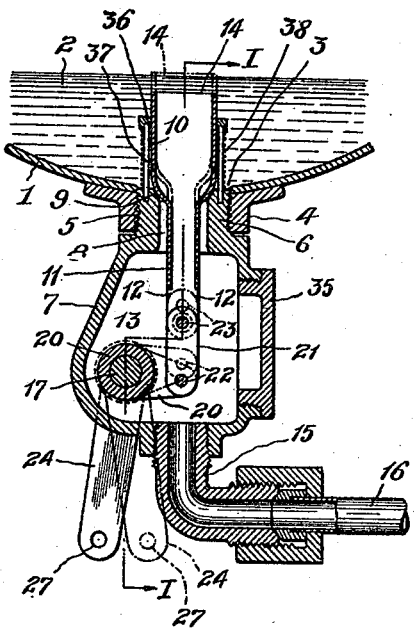
Figure 3:
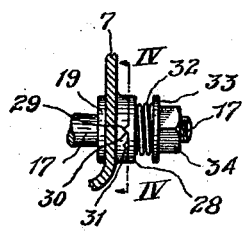
Figure 4:
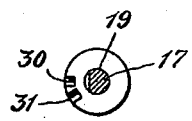

Among the objects of my invention are the provision of a device which may be attached to or incorporated in the structure of the tank so that a reserve supply of liquid may be available for use, after the warning of its approaching exhaustion has been given, without employing an auxiliary tank or the use of partitions of any sort in the tank; the provision of a simple, reliable device which may be attached to the bottom of the tank or receptacle and operated from outside of the tank; the provision of a reserve supply controlling device for a tank which requires only one hole to be made in the tank for installing the device or its subsequent operation. These and other objects are attained by the use of my invention described in the following specification and shown in the accompanying drawings in which Fig. 1 is a vertical section on line I—I of Fig. 2; Fig. 2 is a vertical section on line II—II of Fig. 1; Fig. 3 is a fragmentary section on line III—III of Fig. 1 and Fig. 4 is a section on line IV—IV of Fig. 1.

Referring to the drawings, 1 represents a fragmentary portion of the bottom of a sheet metal tank containing the liquid, 2. In the lower part of the tank, preferably at its lowest point, there is provided an outlet opening, 3. In the construction shown the tank outlet is provided with a flanged pipe connection, 4, internally threaded at 5, to receive the externally threaded hollow shank, 6, of the valve housing member, 7, of my invention. It will be understood that any other suitable means for connecting the housing to the tank may be employed instead of the threaded connection shown in the drawings.

The shank, 6, of the valve housing, 7, is provided with an aperture, 8, at the upper end of which the surrounding wall is preferably chamfered as shown at 9, to provide a seat for a cone or ball valve which forms an external circumferential shoulder upon valve member, 10. Below the valve the lower portion, 11, of the tubular member or hollow valve stem, 10—11, is made smaller in diameter than the aperture, 8, so that when the valve is lifted from its seat, 9, there will be room for liquid to flow out through aperture, 8.

So long as the valve member is held to its seat, 9, liquid can leave the tank only by passing through the hollow tube, 10—11, the upper and lower ends of which are open. With the valve thus closed whenever the level of the liquid in the tank falls below the top of the open end of tube, 10, it will cease to flow, but by lifting the valve from its seat, 9, the remaining liquid in the tank will flow through the open valve.

The lower end of the tubular member, 10, is provided with an opening or openings, 12, into the chamber, 13, which is formed in the housing, 7. The upper end, 14, of the tubular member, 10, is open to permit liquid from the tank to flow through it into the chamber, 13, and thence through the liquid supply connection, 15, and duct, 16, to the apparatus where the liquid is to be used. For operating the tubular valve, 10, there is shown a rotatable tapered rod, 17, having bearings at 18 and 19 in the housing, 7. Rod, 17, has mounted upon it and secured thereto for rotation therewith, preferably a crank or lever, 20, which is connected by means of link, 21, to the lower end of the tubular valve member, 10—11. Link, 21, is pivoted to the lever, 20, by means of pin, 22, and to the tubular valve member, 10—11, by means of pin, 23. Lever, 24, mounted upon and secured to the rod, 17, affords means for rotating the latter and thus for raising and lowering the valve, 10. Means for connecting the lever, 24, to an operating rod so that the device may be operated from a distant point as for instance, the dash of an automobile, is provided in the open hole, 27, near the end of the lever. The rod, 17, having a tapered fit in each of its bearings, 18 and 19, makes fluid tight joints therewith. A D washer, 28, provided with a projection, 29, adapted to click into notches, 30 and 31, may be provided to enable the person operating the valve to feel or determine by hearing the click the open and closed positions of the valve. A spring, 32, washer, 33, and nut, 34, may be provided for holding the tapered rod, 17, to its seat or bearings, 18 and 19 in the housing, 7, of the device. By suitably positioning the notch, 30, relatively to the projection, 29, the spring, 32, also holds the valve, 10, yieldingly closed through the cam action of one side of the projection, 29, upon one side of notch, 30. It will be seen that there is provided positive means for both opening and closing the valve, 10, and yielding means for holding it to its seat.

An opening in the wall of the housing, 7, is provided to permit the assembling of the parts within the chamber, 13, this opening being preferably closed by a threaded and flanged plug, 35, which makes a fluid tight joint with the body member.

To guide the valve member, 10—11, and hold it central with aperture, 8, a ring, 36, may be provided which may be supported by or formed integrally with the shank, 6, of the body member. In the drawings, the ring, 36, is shown supported by rods, 37, which are secured in holes drilled in the shank, 6. A strainer composed of fine-mesh, wire or other fabric such as shown at 38 may be employed to keep particles of foreign matter which naturally settle to the bottom of the liquid receptacle from passing out with the liquid. By supporting the strainer upon the shank, 6, both the shank and strainer may be removed together for cleaning out the receptacle when required.

The operation of my invention is as follows: Assuming that the device is attached to a liquid supply tank as shown in the drawings, and that the valve, 10, is closed upon its seat, 9, the liquid may be caused to flow either by gravity or suction or pressure through the central aperture of the valve, 10—11, until the level of the liquid reaches the top of the valve. At this point the flow of liquid through the device will cease thereby giving warning that the supply of liquid in the tank is approaching exhaustion. If now the valve, 10—11, be opened by raising it from its seat, 9, as shown in dotted lines in Fig. 2, the remainder of the liquid in the tank below the level of the top of the valve will flow through the open valve by way of the aperture, 8, which is made larger in diameter than the tube, 11, and may be used. By making the tube, 10, of suitable height the amount of liquid remaining in the tank when the warning is given may be made anything desired. In the case of a gasoline tank used upon automobiles a reserve supply of from one to two gallons generally enables the driver to reach a service station and replenish his supply of gasoline before the reserve supply is consumed.

Having thus described my invention I claim:

1. The combination with a receptacle adapted to contain liquid and having an outlet opening in the lower part thereof, of a tubular valve member extending through said opening provided with a shoulder adapted to be seated upon the wall surrounding said opening to form a fluid tight joint therewith, the end of said tubular valve member within said receptacle extending upward in said tank above the level of said aperture, the end of said tubular valve member which extends outward through said aperture being smaller in diameter than said aperture, said valve member being mounted for longitudinal movements in said aperture, and means for moving said valve member into and out of engagement with its seat upon said wall.

2. The combination with a tank or receptacle for liquid having an outlet opening in the lower part thereof, of a reserve supply controlling device comprising a valve housing secured to said receptacle having an aperture registering with said outlet opening, the wall of said housing surrounding said aperture and presented to said receptacle forming a valve seat, a tubular valve member in said aperture having an external circumferential shoulder forming an annular valve adapted to be seated upon said valve seat, one end of said tubular valve member being open and extending into said receptacle to a point above the level of said outlet opening and the other end of said tubular valve member extending outward from said outlet opening being open and smaller in diameter than said aperture, and means for operating said valve.

3. In a device of the character described a valve housing having a hollow shank adapted to be connected to the outlet of a liquid receptacle, a hollow valve in said hollow shank having a seat upon the wall of said shank surrounding the opening therethrough and adapted to open or close said opening to the flow of liquid therethrough, said hollow valve extending outward from said seat and being open at its ends to permit the flow of liquid therethrough, and means connected to said outwardly extending portion of said valve for operating said valve.

4. In a device of the character described a valve housing provided with a chamber and adapted to be connected to the outlet opening of a liquid receptacle, said valve housing having an aperture adapted when said valve housing is so connected to conduct liquid from said receptacle to said chamber, said housing having an annular valve seat surrounding said aperture, a tubular valve member having an annular shoulder adapted to be seated upon said valve seat and make a fluid tight joint therewith, said tubular valve member extending upward in said receptacle above the level of said valve seat, the ends of said tubular valve member being open to permit the flow of liquid from said receptacle to said chamber from above the level of the opening in said valve member, and means in said chamber connected to said valve for operating said valve.

5. In a device of the character described a valve housing provided with a chamber and adapted to be connected to the outlet opening of a liquid receptacle, said valve housing having an aperture adapted when said valve housing is so connected to conduct liquid from said receptacle to said chamber, said housing having an annular valve seat surrounding said aperture, a tubular valve member having an annular shoulder adapted to be seated upon said valve seat and make a fluid tight joint therewith, said tubular valve member extending upward in said receptacle above the level of said valve seat, the ends of said tubular valve member being open to permit the flow of liquid from said receptacle to said chamber from above the level of the opening in said valve member, means for operating said valve, and yielding means in said chamber connected to said valve for holding said valve to its seat.

6. In a device of the character described, a valve housing having a hollow shank adapted to be connected to the outlet of a liquid receptacle, a hollow valve in said hollow shank having a seat upon the wall of said shank surrounding the opening therethrough and adapted to open or close said opening to the flow of liquid therethrough, a rotatable rod mounted in said housing, a lever on said rod and connections between said lever and said valve whereby rotation of said rod in one direction causes said valve to open and rotation of said rod in the opposite direction causes said valve to close.

7. In a device of the character described, a valve housing provided with a chamber and adapted to be connected to the outlet opening of a liquid receptacle, said valve housing having an aperture adapted when said valve housing is so connected, to conduct liquid from said receptacle to said chamber, said housing having an annular valve seat surrounding said aperture, a tubular valve member having an annular shoulder adapted to be seated upon said valve seat, said tubular valve member extending upward in said receptacle above the level of said valve seat, the ends of said tubular valve member being open to permit the flow of liquid from said receptacle to said chamber from above the level of the opening in the upper end of said valve member, a rod rotatably mounted in an aperture in the wall of said housing said rod extending into said chamber, a crank on said rod in said chamber, means connecting said crank and said valve whereby rotation of said rod in one direction causes said valve to open and rotation of said rod in the opposite direction causes said valve to close and means for rotating said rod.

8. In a device of the character described, a valve housing provided with a chamber and adapted to be connected to the outlet opening of a liquid receptacle, said valve housing having an aperture adapted when said valve housing is so connected, to conduct liquid from said receptacle to said chamber, said housing having an annular valve seat surrounding said aperture, a tubular valve member having an annular shoulder adapted to be seated upon said valve seat, said tubular valve member extending upward in said receptacle above the level of said valve seat, the ends of said tubular valve member being open to permit the flow of liquid from said receptacle to said chamber from above the level of the opening in the upper end of said valve member, a rod rotatably mounted in an aperture in the wall of said housing said rod extending into said chamber, a crank on said rod, means connecting said crank and said valve whereby rotation of said rod in one direction causes said valve to open and rotation of said rod in the opposite direction causes said valve to close and yielding means connected to said rod for holding said valve closed.

9. In a device of the character described, a valve housing provided with a chamber and adapted to be connected to the outlet opening of a liquid receptacle, said valve housing having an aperture adapted when said valve housing is so connected, to conduct liquid from said receptacle to said chamber, said housing having an annular valve seat surrounding said aperture, a tubular valve member having an annular shoulder adapted to be seated upon said valve seat, said tubular valve member extending upward in said receptacle above the level of said valve seat, the ends of said tubular valve member being open to permit the flow of liquid from said receptacle to said chamber from above the level of the opening in the upper end of said valve member, a tapered rod extending through said chamber transversely to the axis of said valve member, said tapered rod being rotatably mounted in correspondingly tapered apertures in the wall of said housing, a crank secured on said rod in said chamber, means connecting said crank and said valve whereby rotation of said rod in one direction causes said valve to open and rotation of said rod in the opposite direction causes said valve to close, the larger end of said rod being extended outward from the wall of said housing, means connected to said rod for rotating it, the smaller end of said rod also extending outward from the wall of said housing, a washer slidably mounted on said outwardly extending smaller end of said rod and secured to said rod for rotation therewith, said washer having a projection presented toward said housing and said housing having a positioning notch presented to said washer adapted to receive said projection, a compression spring surrounding said projecting smaller end of said rod having one end pressing against said washer and means secured to said rod forming an abutment for the other end of said spring.

In testimony whereof I affix my signature.

ANDREW J. SCHREINER.